(No Model.) 2 Sheets—Sheet 2.
T. B. SLOPER.
PNEUMATIC TIRE.
No. 564,114. Patented July 14, 1896.
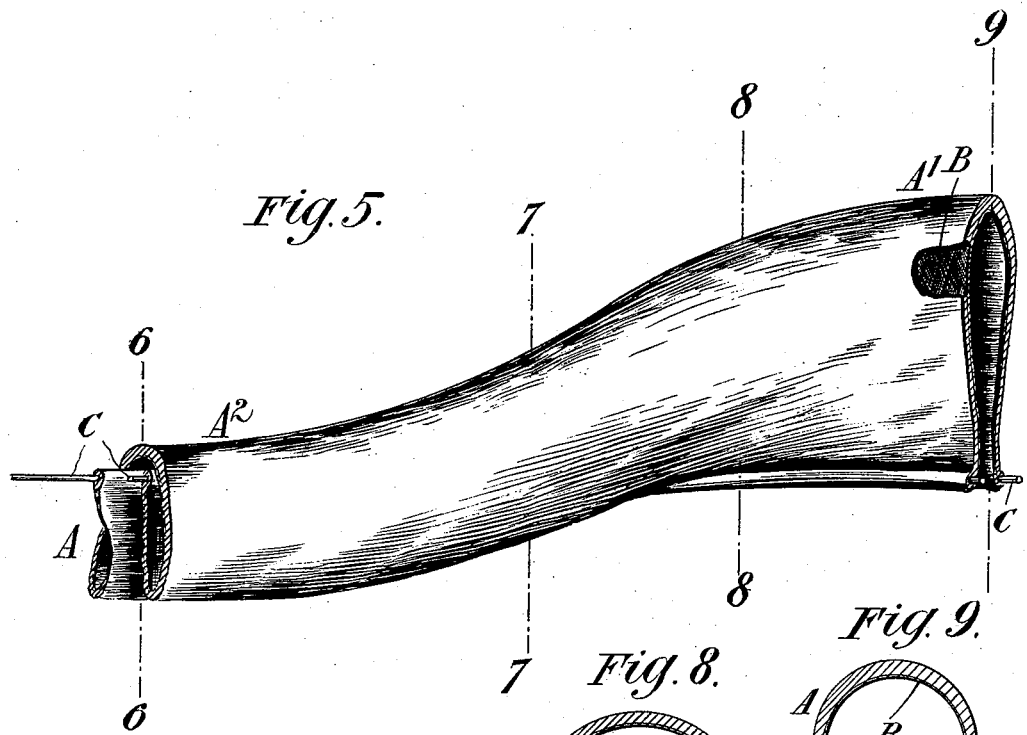
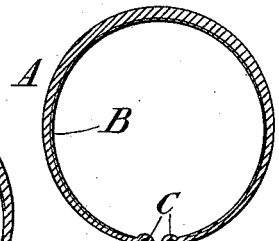
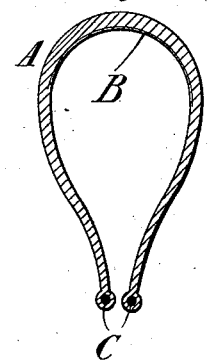
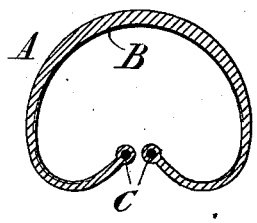
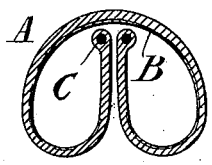
Witnesses:
J. M. Fowler Jr.
Thomas Durant
Inventor:
Thomas B. Sloper
by Clemet & Clemet
his Attorneys.

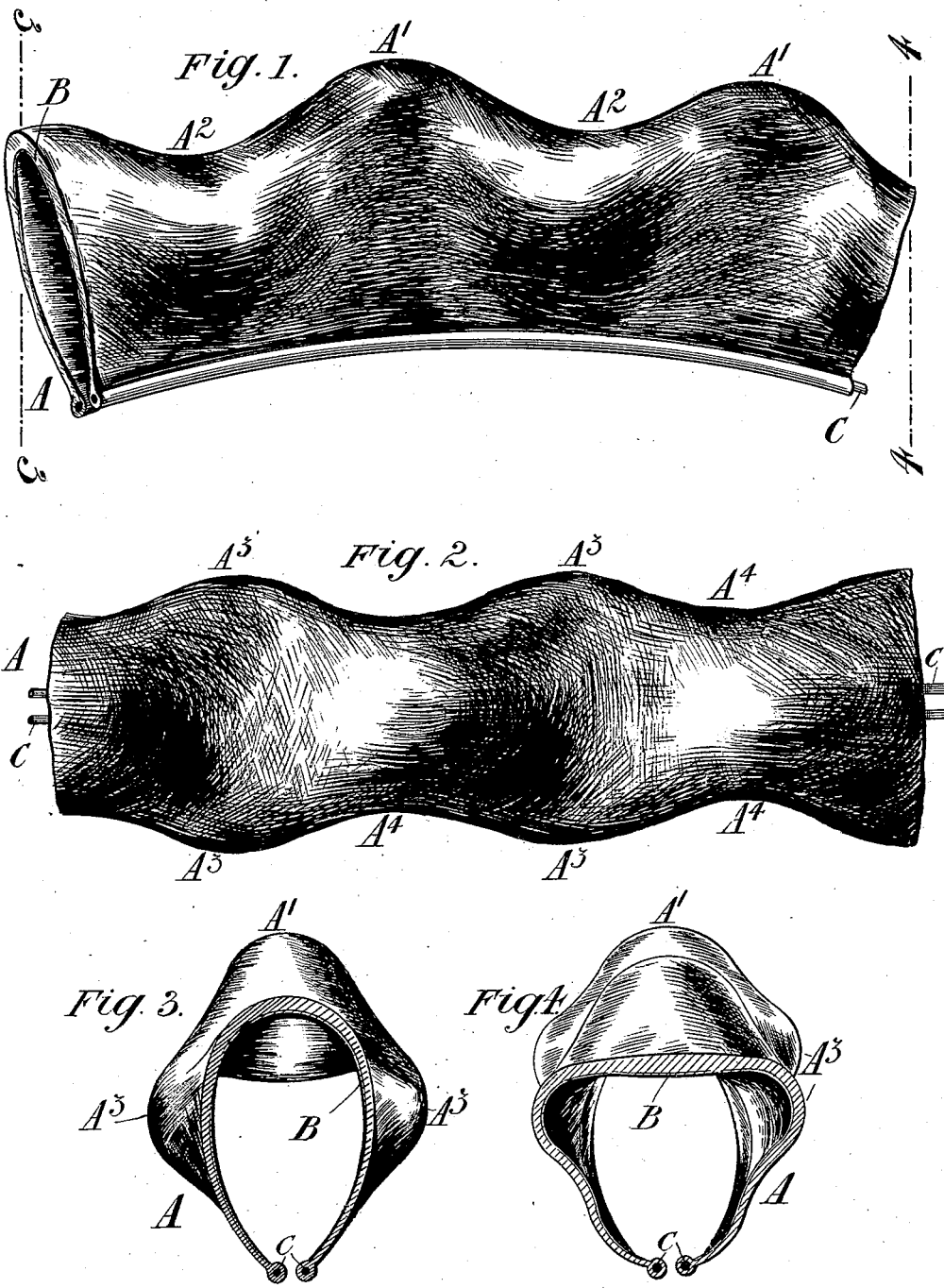

UNITED STATES PATENT OFFICE.

THOMAS BEAVAN SLOPER, OF DEVIZES, ENGLAND.

PNEUMATIC TIRE.

SPECIFICATION forming part of Letters Patent No. 564,114, dated July 14, 1896.

Application filed April 23, 1895. Serial No. 546,920. (No model.) Patented in England June 21, 1894, No. 12,028.

*To all whom it may concern:*

Be it known that I, THOMAS BEAVAN SLOPER, a subject of the Queen of England, residing at Devizes, in the county of Wilt, England, have invented certain new and useful Improvements in or Relating to Pneumatic Tires, (for which I have obtained Letters Patent in Great Britain, No. 12,028, dated June 21, 1894,) of which the following is a specification.

This invention relates to certain improvements in or relating to pneumatic tires, and has for its object so to construct a tire that when it is inflated the rubber at the tread-surface shall be in compression, and thereby rendered less liable to puncture than a tire as ordinarily constructed.

When an ordinary pneumatic tire is removed from the vulcanizing-mold, the rubber contracts or shrinks, and when the tire is inflated, it stretches again. Consequently the rubber of the tire is under slight tension at every part, in which condition it is particularly liable to puncture. A thorn or sharp substance would as a rule only enter a slight distance into the tire during the first revolution of the wheel, but it would enter a little farther each successive revolution, until at last the air-tube would be punctured. Consequently what is required is to compress the rubber of the outer cover or skin of the tire, that is to say, the part which makes actual contact with the ground, so as to render it less liable to take up a thorn or other article likely to puncture the air-tube, and so that it would have a tendency to force the thorn out if it should enter; and this, as above set forth, is the object of my present invention.

The invention will be best understood by reference to the accompanying drawings, in which—

Figures 1 and 2 are respectively a side elevation and a plan of portion of a pneumatic tire constructed according to this invention. Figs. 3 and 4 are transverse sections or sectional elevations taken, respectively, on the lines 3 3 and 4 4 of Fig. 1. Fig. 5 is a side elevation of portion of an alternative form of the tire. Figs. 6, 7, 8, and 9 are transverse sections or sectional elevations taken, respectively, on the lines 6 6, 7 7, 8 8, and 9 9 of Fig. 5; and Fig. 10 illustrates a modification.

All the drawings represent the tires in their deflated condition. There need be little or no difference in the appearance of these improved tires and other pneumatic tires when in their inflated condition.

Like letters indicate like parts throughout the drawings.

In order to attain the result above set forth, I make the tire A of india-rubber and flexible fibrous material or fabric B, the latter for restraining or limiting the expansion of the tire. Any suitable material may be used for this purpose, but I prefer a material which is more or less inextensible in one direction and free to stretch in the other direction. I then vulcanize the rubber combined with the restraining material B in a mold of peculiar formation, which causes the tire to take a corrugated or indented form at either the tread-surface alone, or, as shown in the accompanying drawings, at both the tread-surface and the sides of the tire A.

In Figs. 1, 2, 3, and 4 the tread-surface corrugations are lettered $A'$ $A^2$, $A'$ indicating the projecting parts hereinafter termed "tread-projections," and $A^2$ the hollows between the projections hereinafter termed "tread-recesses." The side projections are lettered $A^3$ and the side recesses $A^4$. In this manner, as shown in the drawings, each tread-recess $A^2$ crossing the tread-surface at right angles coincides with two side projections $A^3$, one on each side of the tire, and is immediately preceded and followed by a tread projection $A'$, each of which coincides with two side recesses $A^4$, one on each side of the tire, and so on throughout the circumference of the tire. The arrangement of the side corrugations may, however, be modified, for example, as shown on a reduced scale in Fig. 10, the corrugations on one side of the tire, instead of corresponding with those at the opposite side, may alternate therewith, so that the portion of the tire outside the wheel-rim would take a zigzag form when deflated.

It will be obvious that the outer circumference or tread-surface of the before-described tire is of considerably greater area and contains more material than a tire made with an even surface, and, moreover, when deflated the air-space inside the tire is less than that of an ordinary tire of the same size. The material, however, is homogeneous throughout the tire while it is in this deflated condition. When the tire is inflated, the air-pressure forces out the indented portions or recesses $A^2$ $A^4$, and thereby draws in the projections $A'$ $A^3$ of the tire; and as the restraining material prevents the tire from stretching, the effect is to compress the rubber forming the tire, and thus render it less liable to puncture.

I prefer that the width of the restraining material should be uniform throughout the circumference of the tire A, so that upon inflation the tire may be of uniform cross-sectional area at all parts. When, however, for giving a greater degree of compression of the rubber at the tread than would otherwise be obtained, the corrugations $A'$ $A^2$ $A^3$ $A^4$ are so deep or close together that the pressure of air ordinarily used for inflating the tire would be insufficient to cause the corrugations to quite disappear, the restraining material may, if desired, be a little wider at the parts corresponding with the tread-recesses $A^2$, in order that such recesses shall disappear when the tire is inflated.

In the accompanying drawings I have represented the tires A as provided at the edges with wires C, wherewith to secure them to the wheel-rims, but I do not restrict myself to this or any other particular means of fastening, as almost any kind of fastening or attachment is applicable to tires made according to my invention. I would point out, however, that when wire or other inextensible material is used at the edges of my improved tire or cover, the effect of inflation is somewhat different to that which occurs with ordinary saddle-shaped covers, for, in consequence of the excess of material in the side walls, the tendency of the wires to separate from each other when the air-tube is inflated is sometimes counteracted or reversed, the tendency being rather for the wires to draw together. In such cases the wired edges of the cover may engage with grooves located outside the edges of the wheel-rim, especially if restraining material is used in the air-tube.

In the alternative form of the tire shown in Figs. 5 to 9, inclusive, each of the corrugations $A'$ $A^2$ $A^3$ $A^4$ extends over a greater length of the complete circumference than the individual corrugations in the preceding example, and, moreover, they are considerably deeper, the tread projections $A'$ extending considerably to the outside of the edge wires B, as shown particularly in Fig. 9, and the tread-recesses $A^2$ extending inward as close as practicable to the wires B, as shown particularly in Fig. 6. At the parts corresponding with the tread-recesses $A^2$ the sides of the tire overlap the wires B and the main portion of the tire's substance is located at the inside of the wires B—that is to say, it is nearer to the axis of the complete tire than is the portion of the tire corresponding with each tread projection $A'$.

By referring to Figs. 6, 7, 8, and 9 it will be seen that the tire A varies in width in substantially the same manner as that shown in Figs. 1, 2, 3, and 4, the widest parts corresponding with the tread-recesses $A^2$ and the narrowest parts with the tread projections $A'$ and graduating between these two extremes, so that it may be pointed out that, like said previous example, the one last described is formed with side corrugations as well as tread-corrugations.

I am aware that tires have been made with the inside rubber in compression by turning tubes or covers inside out after vulcanizing, but this method puts extra strain on the fabric, and, moreover, although the inner side of each such tire is under compression, the outer side, where it is of the utmost importance that it should be in compression, is under tension, in which condition it is particularly liable to puncture.

I am also aware that the inner or air tubes of pneumatic tires have been corrugated for the purpose of placing the rubber of these tubes under compression when they are forced by the air-pressure against the outer tube or restraining-cover; but this again has the same defect as the previously-cited example—viz., the susceptibility of the outer tube or restraining-cover to puncture.

In my arrangement the whole of the rubber of the tire-cover outside the wheel-rim is more or less under compression, as well as the fabric, when the tire is inflated.

The compression of the rubber renders this form of tire much more resilient than tires of the ordinary construction, as the "spring" of the rubber acts in conjunction with the air-pressure instead of in opposition to it, as occurs in all tires the rubber of which is under tension.

In case of the tire coming in contact with a small stone or obstruction on the road, the free or extra material in the tire allows the latter to absorb the obstruction, thus economizing power.

Instead of canvas, I prefer to use transverse fibrous threads to strengthen and limit the expansion of the tire, and when the rubber is under compression, longitudinal threads are not absolutely necessary.

This invention is applicable to either single-tube or detachable tires.

This invention is capable of considerable modifications. For instance, the tire may be made with corrugations on the tread-surface only, and the corrugations may be of any desired form other than that shown in the drawings. For example, they may be of circular form and made in various parts of the tire, the object being to vulcanize the tire in such a form that its surface area is larger when deflated than when inflated.

I do not confine myself to any particular arrangement in obtaining the last-mentioned result, but I prefer to so arrange the tire that the tread part shall not be drawn or forced to either side either upon deflation or inflation.

I claim—

1. A pneumatic tire the restraining material and substance of which when deflated are corrugated and its tread portion not in compression and when inflated is, not corrugated and has its tread portion in compression; substantially as set forth.

2. A pneumatic tire having restraining material to limit its expansion and so constructed that when deflated its restraining material will be waved or corrugated and its tread portion will not be in compression and when inflated its restraining material will be less waved or less corrugated and its tread portion will be in compression; substantially as described.

3. The combination with a cover for a pneumatic tire so constructed that when deflated its restraining material and substance are corrugated and its tread portion is not in compression and when inflated it is not corrugated and its tread portion is in compression of inextensible material in its edges; substantially as set forth.

4. A pneumatic tire which when deflated has the exterior of its sides and its restraining material corrugated and its tread portion not in compression and when inflated has its sides and restraining material not corrugated and its tread portion in compression; substantially as set forth.

5. A pneumatic tire which when deflated has the exterior of its tread portion its restraining material and its sides corrugated and not in compression and when inflated has its tread portion its restraining material and its sides not corrugated and the tread portion in compression; substantially as set forth.

6. A pneumatic tire whose restraining material exterior tread portion and sides are corrugated and the tread portion not in compression when the tire is deflated the projections of the tread corrugations as regards the circumferential position on the tire corresponding with the side recesses and the tread recesses with the side projections and in which when the tire is inflated the corrugations approximately disappear and the tread portion is in compression; substantially as set forth.

7. A pneumatic tire whose restraining material and sides are corrugated and tread portion not in compression when the tire is deflated the projections of the corrugations at one side as regards the circumferential position on the tire corresponding with the recesses at the other side all these corrugations approximately disappearing and the tread portion being in compression when the tire is inflated; substantially as set forth.

8. A pneumatic tire which when deflated has the restraining material of its sides corrugated and its tread portion not in compression and when inflated has approximately no corrugations and its tread portion in compression the projections of the corrugations at one side of the tire as regards circumferential position on the tire corresponding with the recesses of the corrugations at the other side; substantially as set forth.

9. A pneumatic tire the restraining material and rubber of which when deflated are corrugated and its tread portion not in compression and when inflated is not corrugated and its tread portion in compression and in which when in its deflated condition the main portion of its substance adjacent to the corrugation projections is located outside.

10. A pneumatic tire vulcanized with bulges in the restraining material and substance at each side combined with a depression at the tread portion and with a bulge at the tread portion combined with depressions at each side arranged alternately round the tire; substantially as and for the purpose described.

11. An endless band or cover for a pneumatic tire inelastic at both edges and of approximately equal width at every part the restraining material and substance of the central portion being corrugated and having a gradually increasing excess of material from the edge on each side to the center of the band; substantially as described.

12. A saddle-shaped cover for a pneumatic tire restrained circumferentially by wires or inelastic material at its smaller circumference or selvages molded with an excess of restraining material and india-rubber both in the form of corrugations or waves in the side walls and tread portion such excess of material being so arranged that upon inflation of the tire it causes distortion or compression of the rubber; substantially as described.

In testimony whereof I have hereunto set my hand in the presence of the two subscribing witnesses.

THOMAS BEAVAN SLOPER.

Witnesses:
ALFRED J. BOULT,
HARRY B. BRIDGES.